(12) United States Patent
Yea et al.

(10) Patent No.: US 11,568,571 B2
(45) Date of Patent: Jan. 31, 2023

(54) TECHNIQUES AND APPARATUS FOR LOSSLESS LIFTING FOR ATTRIBUTE CODING

(71) Applicant: TENCENT AMERICA LLC, Palo Alto, CA (US)

(72) Inventors: Sehoon Yea, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 254 days.

(21) Appl. No.: 17/031,114

(22) Filed: Sep. 24, 2020

(65) Prior Publication Data

US 2021/0104073 A1    Apr. 8, 2021

Related U.S. Application Data

(60) Provisional application No. 62/958,852, filed on Jan. 9, 2020, provisional application No. 62/910,395, filed on Oct. 3, 2019, provisional application No. 62/910,390, filed on Oct. 3, 2019.

(51) Int. Cl.
| | |
|---|---|
| *G06T 9/00* | (2006.01) |
| *G06T 13/00* | (2011.01) |
| *G06T 15/00* | (2011.01) |
| *G06T 17/00* | (2006.01) |
| *G06T 19/00* | (2011.01) |
| *H04L 65/403* | (2022.01) |

(52) U.S. Cl.
CPC ............. *G06T 9/00* (2013.01); *G06T 13/00* (2013.01); *G06T 15/00* (2013.01); *G06T 17/00* (2013.01); *G06T 19/00* (2013.01); *H04L 65/403* (2013.01)

(58) Field of Classification Search
CPC .......... G06T 9/001; G06T 9/40; G06T 17/00; G06T 9/00; G06T 13/00; G06T 15/00; G06T 19/00; G06T 2210/36; G06T 2210/56; G06T 9/008; G06T 9/007
See application file for complete search history.

(56) References Cited

U.S. PATENT DOCUMENTS

| | | | |
|---|---|---|---|
| 2019/0311499 A1* | 10/2019 | Mammou | G06T 9/00 |
| 2020/0273211 A1* | 8/2020 | Kato | H03M 7/3079 |
| 2022/0224940 A1* | 7/2022 | Hur | G06T 17/00 |

* cited by examiner

*Primary Examiner* — Hau H Nguyen
(74) *Attorney, Agent, or Firm* — Sughrue Mion, PLLC (57) ABSTRACT

A method of point cloud attribute coding includes obtaining an attribute signal corresponding to a point cloud; determining whether lossless lifting is enabled; based on determining that lossless lifting is enabled, modifying at least one from among a plurality of quantization weight and a plurality of lifting coefficients; decomposing the attribute signal into a plurality of detail signals and a plurality of approximation signals based on the modified at least one from among the plurality of quantization weights and the plurality of lifting coefficients; generating a bitstream representing the point cloud based on the plurality of detail signals and the plurality of approximation signals; and transmitting the bitstream.

18 Claims, 8 Drawing Sheets

TECHNIQUES AND APPARATUS FOR LOSSLESS LIFTING FOR ATTRIBUTE CODING

CROSS-REFERENCE TO RELATED APPLICATION

This application claims priority from U.S. Provisional Patent Application No. 62/910,390, filed on Oct. 3, 2019, U.S. Provisional Patent Application No. 62/910,395, filed on Oct. 3, 2019, and U.S. Provisional Patent Application No. 62/958,852, filed on Jan. 9, 2020, in the U.S. Patent and Trademark Office, which are incorporated herein by reference in their entireties.

BACKGROUND

1. Field

Methods and apparatuses consistent with embodiments relate to graph-based point cloud compression (G-PCC), and more particularly, coding of attribute information of point cloud samples, including scalable coding.

2. Description of Related Art

Advanced three-dimensional (3D) representations of the world are enabling more immersive forms of interaction and communication, and also allow machines to understand, interpret and navigate our world. 3D point clouds have emerged as an enabling representation of such information. A number of use cases associated with point cloud data have been identified, and corresponding requirements for point cloud representation and compression have been developed.

A point cloud is a set of points in a 3D space, each with associated attributes, e.g., color, material properties, etc. Point clouds can be used to reconstruct an object or a scene as a composition of such points. They can be captured using multiple cameras and depth sensors in various setups, and may be made up of thousands up to billions of points to realistically represent reconstructed scenes.

Compression technologies are needed to reduce the amount of data to represent a point cloud. As such, technologies are needed for lossy compression of point clouds for use in real-time communications and six degrees of freedom (6 DoF) virtual reality. In addition, technology is sought for lossless point cloud compression in the context of dynamic mapping for autonomous driving and cultural heritage applications, etc. The Moving Picture Experts Group (MPEG) has started working on a standard to address compression of geometry and attributes such as colors and reflectance, scalable/progressive coding, coding of sequences of point clouds captured over time, and random access to subsets of a point cloud.

SUMMARY

According to embodiments, a method of point cloud attribute coding may be performed by at least one processor and may include obtaining an attribute signal corresponding to a point cloud; determining whether lossless lifting is enabled; based on determining that lossless lifting is enabled, modifying at least one from among a plurality of quantization weight and a plurality of lifting coefficients; decomposing the attribute signal into a plurality of detail signals and a plurality of approximation signals based on the modified at least one from among the plurality of quantization weights and the plurality of lifting coefficients; generating a bitstream representing the point cloud based on the plurality of detail signals and the plurality of approximation signals; and transmitting the bitstream.

According to embodiments, an apparatus for point cloud attribute coding may include at least one memory configured to store computer program code; and at least one processor configured to access the at least one memory and operate according to the computer program code, the computer program code including obtaining code configured to cause the at least one processor to obtain an attribute signal corresponding to a point cloud; determining code configured to cause the at least one processor to determine whether lossless lifting is enabled; modifying code configured to cause the at least one processor to, based on determining that lossless lifting is enabled, modify at least one from among a plurality of quantization weight and a plurality of lifting coefficients; decomposing code configured to cause the at least one processor to decompose the attribute signal into a plurality of detail signals and a plurality of approximation signals based on the modified at least one from among the plurality of quantization weights and the plurality of lifting coefficients; generating code configured to cause the at least one processor to generate a bitstream representing the point cloud based on the plurality of detail signals and the plurality of approximation signals; and transmitting code configured to cause the at least one processor to transmit the bitstream.

According to embodiments, a non-transitory computer-readable medium may store instructions, the instructions including one or more instructions that are configured to, when executed by one or more processors of a device for point cloud attribute coding, cause the one or more processors to: obtain an attribute signal corresponding to a point cloud; determine whether lossless lifting is enabled; based on determining that lossless lifting is enabled, modify at least one from among a plurality of quantization weight and a plurality of lifting coefficients; decompose the attribute signal into a plurality of detail signals and a plurality of approximation signals based on the modified at least one from among the plurality of quantization weights and the plurality of lifting coefficients; generate a bitstream representing the point cloud based on the plurality of detail signals and the plurality of approximation signals; and transmit the bitstream.

DETAILED DESCRIPTION

Embodiments relate to the current G-PCC lifting design, and to methods of extending or modifying it to enable lossless coding of lifting coefficients. In addition, embodiments relate to scalable coding of attributes under the current G-PCC lifting design. These embodiments can be applied to similar codecs designed for point clouds.

Figure 1:
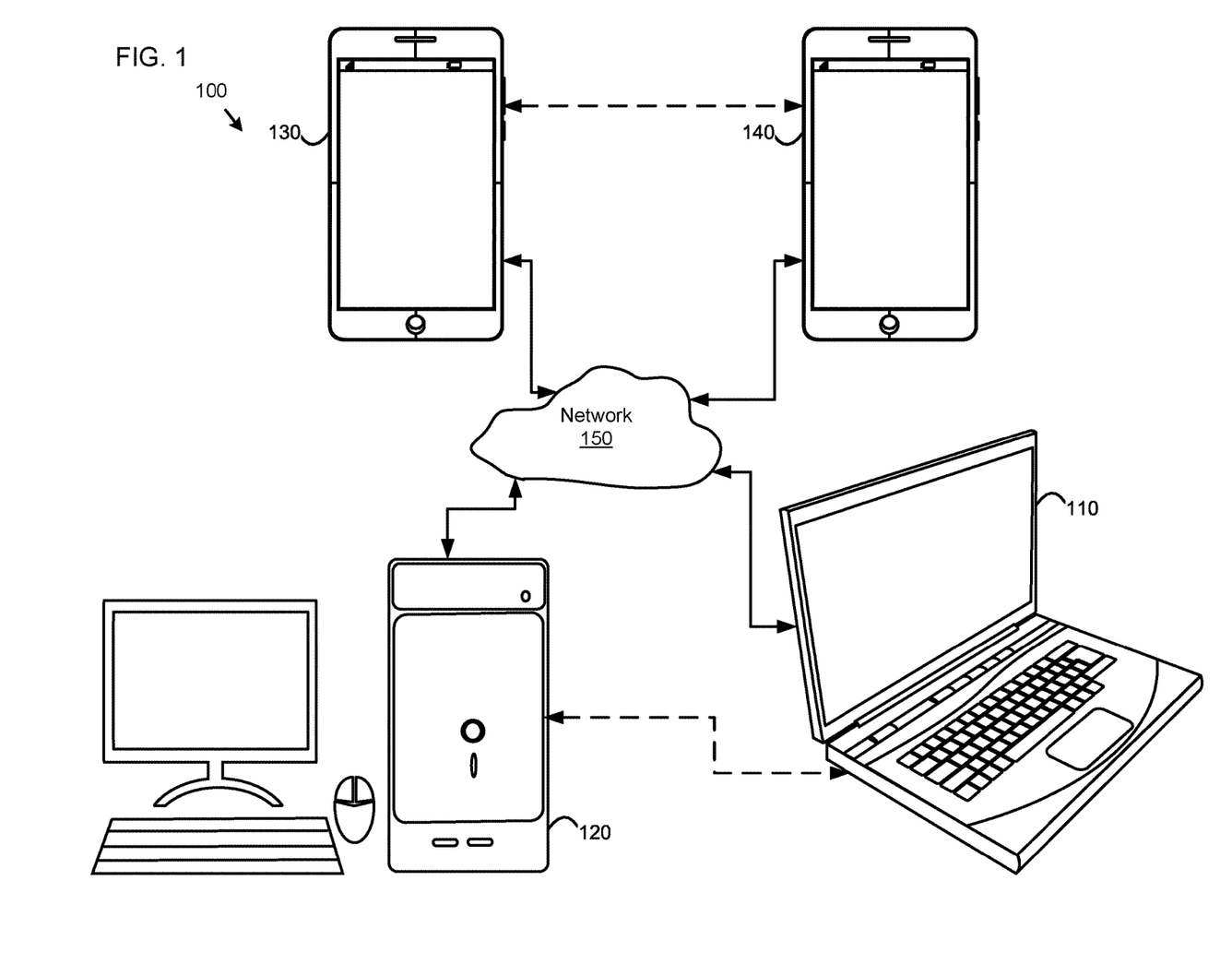
FIG. 1 is a block diagram of a communication system according to embodiments.

FIG. 1 is a block diagram of a communication system 100 according to embodiments. The communication system 100 may include at least two terminals 110 and 120 interconnected via a network 150. For unidirectional transmission of data, a first terminal 110 may code point cloud data at a local location for transmission to a second terminal 120 via the network 150. The second terminal 120 may receive the coded point cloud data of the first terminal 110 from the network 150, decode the coded point cloud data and display the decoded point cloud data. Unidirectional data transmission may be common in media serving applications and the like.

FIG. 1 further illustrates a second pair of terminals 130 and 140 provided to support bidirectional transmission of coded point cloud data that may occur, for example, during videoconferencing. For bidirectional transmission of data, each terminal 130 or 140 may code point cloud data captured at a local location for transmission to the other terminal via the network 150. Each terminal 130 or 140 also may receive the coded point cloud data transmitted by the other terminal, may decode the coded point cloud data and may display the decoded point cloud data at a local display device.

In FIG. 1, the terminals 110-240 may be illustrated as servers, personal computers and smartphones, but principles of the embodiments are not so limited. The embodiments find application with laptop computers, tablet computers, media players and/or dedicated video conferencing equipment. The network 150 represents any number of networks that convey coded point cloud data among the terminals 110-140, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, an architecture and topology of the network 150 may be immaterial to an operation of the embodiments unless explained herein below.

Figure 2:
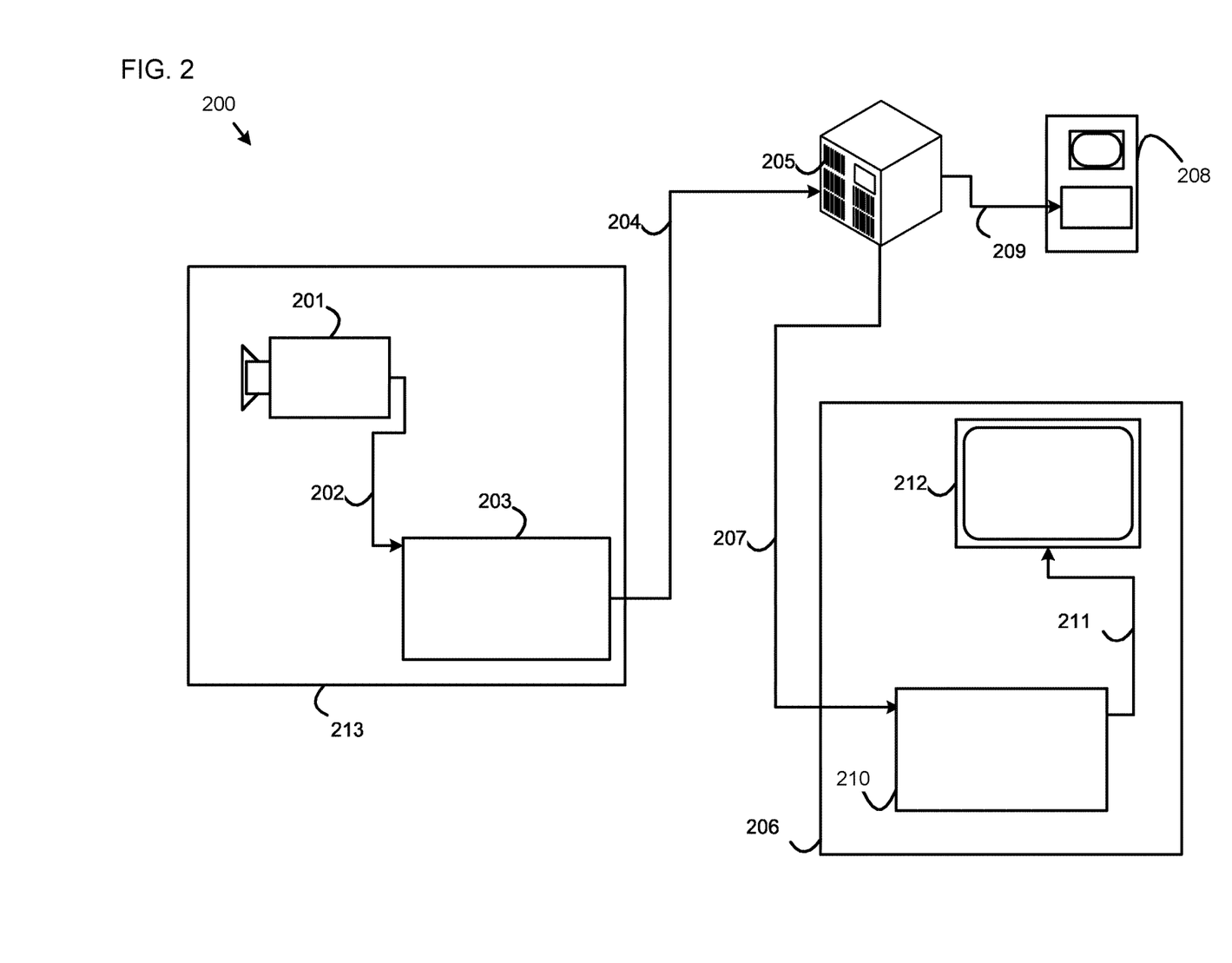
FIG. 2 is a diagram of a placement of a G-PCC compressor and a G-PCC decompressor in an environment, according to embodiments.

FIG. 2 is a diagram of a placement of a G-PCC compressor 203 and a G-PCC decompressor 210 in an environment, according to embodiments. The disclosed subject matter can be equally applicable to other point cloud enabled applications, including, for example, video conferencing, digital TV, storing of compressed point cloud data on digital media including CD, DVD, memory stick and the like, and so on.

A streaming system 200 may include a capture subsystem 213 that can include a point cloud source 201, for example a digital camera, creating, for example, uncompressed point cloud data 202. The point cloud data 202 having a higher data volume can be processed by the G-PCC compressor 203 coupled to the point cloud source 201. The G-PCC compressor 203 can include hardware, software, or a combination thereof to enable or implement aspects of the disclosed subject matter as described in more detail below. Encoded point cloud data 204 having a lower data volume can be stored on a streaming server 205 for future use. One or more streaming clients 206 and 208 can access the streaming server 205 to retrieve copies 207 and 209 of the encoded point cloud data 204. A client 206 can include the G-PCC decompressor 210, which decodes an incoming copy 207 of the encoded point cloud data and creates outgoing point cloud data 211 that can be rendered on a display 212 or other rendering devices (not depicted). In some streaming systems, the encoded point cloud data 204, 207 and 209 can be encoded according to video coding/compression standards. Examples of those standards include those being developed by MPEG for G-PCC.

Figure 3:
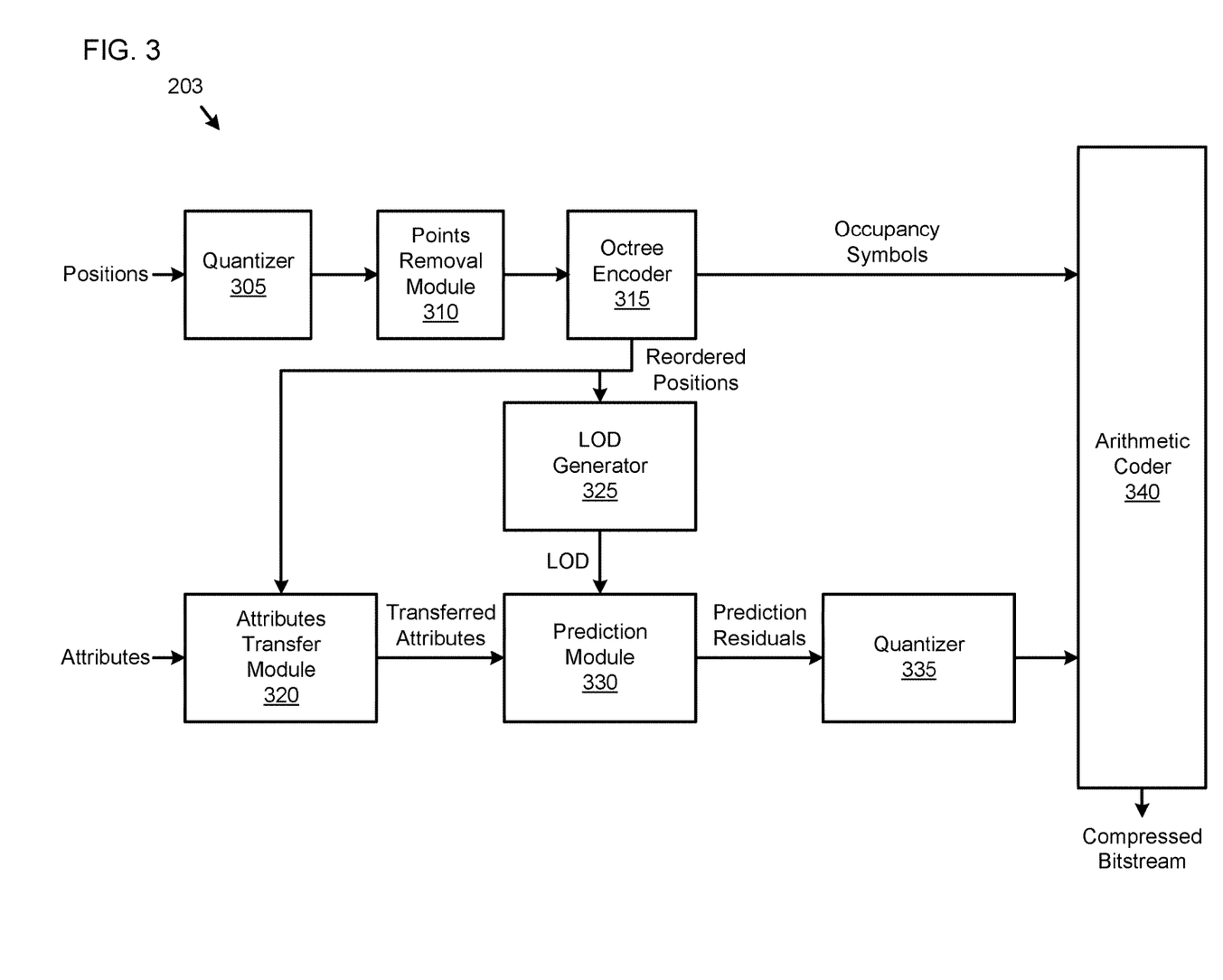
FIG. 3 is a functional block diagram of the G-PCC compressor according to embodiments.

FIG. 3 is a functional block diagram of a G-PCC compressor 203 according to embodiments.

As shown in FIG. 3, the G-PCC compressor 203 includes a quantizer 305, a points removal module 310, an octree encoder 315, an attributes transfer module 320, an LoD generator 325, a prediction module 330, a quantizer 335 and an arithmetic coder 340.

The quantizer 305 receives positions of points in an input point cloud. The positions may be (x,y,z)-coordinates. The quantizer 305 further quantizes the received positions, using, e.g., a scaling algorithm and/or a shifting algorithm.

The points removal module 310 receives the quantized positions from the quantizer 305, and removes or filters duplicate positions from the received quantized positions.

The octree encoder 315 receives the filtered positions from the points removal module 310, and encodes the received filtered positions into occupancy symbols of an octree representing the input point cloud, using an octree encoding algorithm. A bounding box of the input point cloud corresponding to the octree may be any 3D shape, e.g., a cube.

The octree encoder 315 further reorders the received filtered positions, based on the encoding of the filtered positions.

The attributes transfer module 320 receives attributes of points in the input point cloud. The attributes may include, e.g., a color or RGB value and/or a reflectance of each point. The attributes transfer module 320 further receives the reordered positions from the octree encoder 315.

The attributes transfer module 320 further updates the received attributes, based on the received reordered positions. For example, the attributes transfer module 320 may perform one or more among pre-processing algorithms on the received attributes, the pre-processing algorithms including, for example, weighting and averaging the received attributes and interpolation of additional attributes from the received attributes. The attributes transfer module 320 further transfers the updated attributes to the prediction module 330.

The LoD generator 325 receives the reordered positions from the octree encoder 315, and obtains an LoD of each of the points corresponding to the received reordered positions. Each LoD may be considered to be a group of the points, and may be obtained based on a distance of each of the points.

The prediction module 330 receives the transferred attributes from the attributes transfer module 320, and receives the obtained LoD of each of the points from the LoD generator 325. The prediction module 330 obtains prediction residuals (values) respectively of the received attributes by applying a prediction algorithm to the received attributes in an order based on the received LoD of each of the points. The prediction algorithm may include any among various prediction algorithms such as, e.g., interpolation, weighted average calculation, a nearest neighbor algorithm and RDO.

The quantizer 335 receives the obtained prediction residuals from the prediction module 330, and quantizes the received predicted residuals, using, e.g., a scaling algorithm and/or a shifting algorithm.

The arithmetic coder 340 receives the occupancy symbols from the octree encoder 315, and receives the quantized prediction residuals from the quantizer 335. The arithmetic coder 340 performs arithmetic coding on the received occupancy symbols and quantized predictions residuals to obtain a compressed bitstream. The arithmetic coding may include any among various entropy encoding algorithms such as, e.g., context-adaptive binary arithmetic coding.

Figure 4:
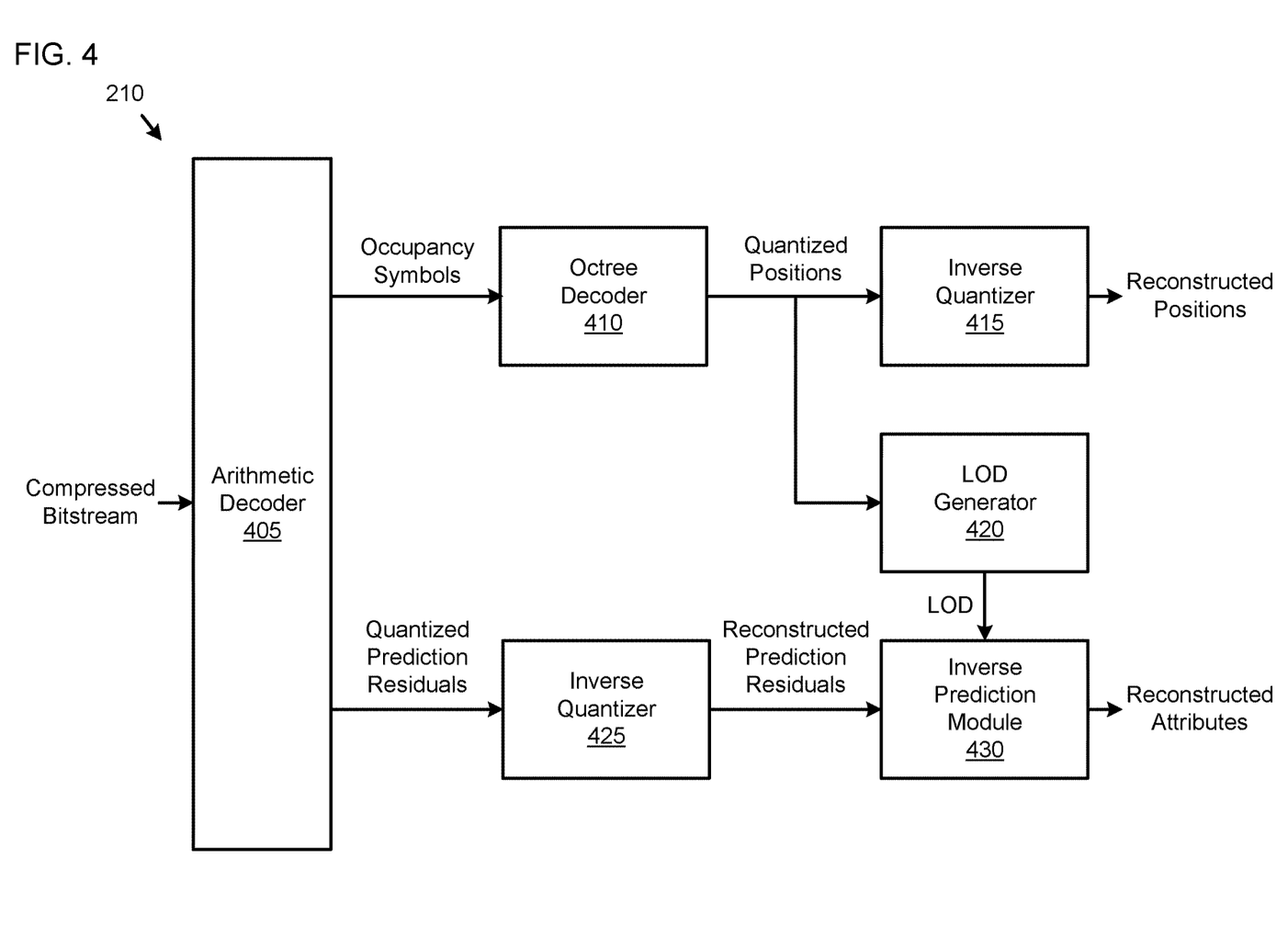
FIG. 4 is a functional block diagram of the G-PCC decompressor according to embodiments.

FIG. 4 is a functional block diagram of a G-PCC decompressor 210 according to embodiments.

As shown in FIG. 4, the G-PCC decompressor 210 includes an arithmetic decoder 405, an octree decoder 410, an inverse quantizer 415, an LoD generator 420, an inverse quantizer 425 and an inverse prediction module 430.

The arithmetic decoder 405 receives the compressed bitstream from the G-PCC compressor 203, and performs arithmetic decoding on the received compressed bitstream to obtain the occupancy symbols and the quantized prediction residuals. The arithmetic decoding may include any among various entropy decoding algorithms such as, e.g., context-adaptive binary arithmetic decoding.

The octree decoder 410 receives the obtained occupancy symbols from the arithmetic decoder 405, and decodes the received occupancy symbols into the quantized positions, using an octree decoding algorithm.

The inverse quantizer 415 receives the quantized positions from the octree decoder 410, and inverse quantizes the received quantized positions, using, e.g., a scaling algorithm and/or a shifting algorithm, to obtain reconstructed positions of the points in the input point cloud.

The LoD generator 420 receives the quantized positions from the octree decoder 410, and obtains the LoD of each of the points corresponding to the received quantized positions.

The inverse quantizer 425 receives the obtained quantized prediction residuals, and inverse quantizes the received quantized prediction residuals, using, e.g., a scaling algorithm and/or a shifting algorithm, to obtain reconstructed prediction residuals.

The inverse prediction module 430 receives the obtained reconstructed prediction residuals from the inverse quantizer 425, and receives the obtained LoD of each of the points from the LoD generator 420. The inverse prediction module 430 obtains reconstructed attributes respectively of the received reconstructed prediction residuals by applying a prediction algorithm to the received reconstructed prediction residuals in an order based on the received LoD of each of the points. The prediction algorithm may include any among various prediction algorithms such as, e.g., interpolation, weighted average calculation, a nearest neighbor algorithm and RDO. The reconstructed attributes are of the points in the input point cloud.

The method and the apparatus for inter-channel prediction and transform for point cloud attribute coding will now be described in detail. Such a method and an apparatus may be implemented in the G-PCC compressor 203 described above, namely, the prediction module 430. The method and the apparatus may also be implemented in the G-PCC decompressor 210, namely, the inverse prediction module 430.

Figure 5:
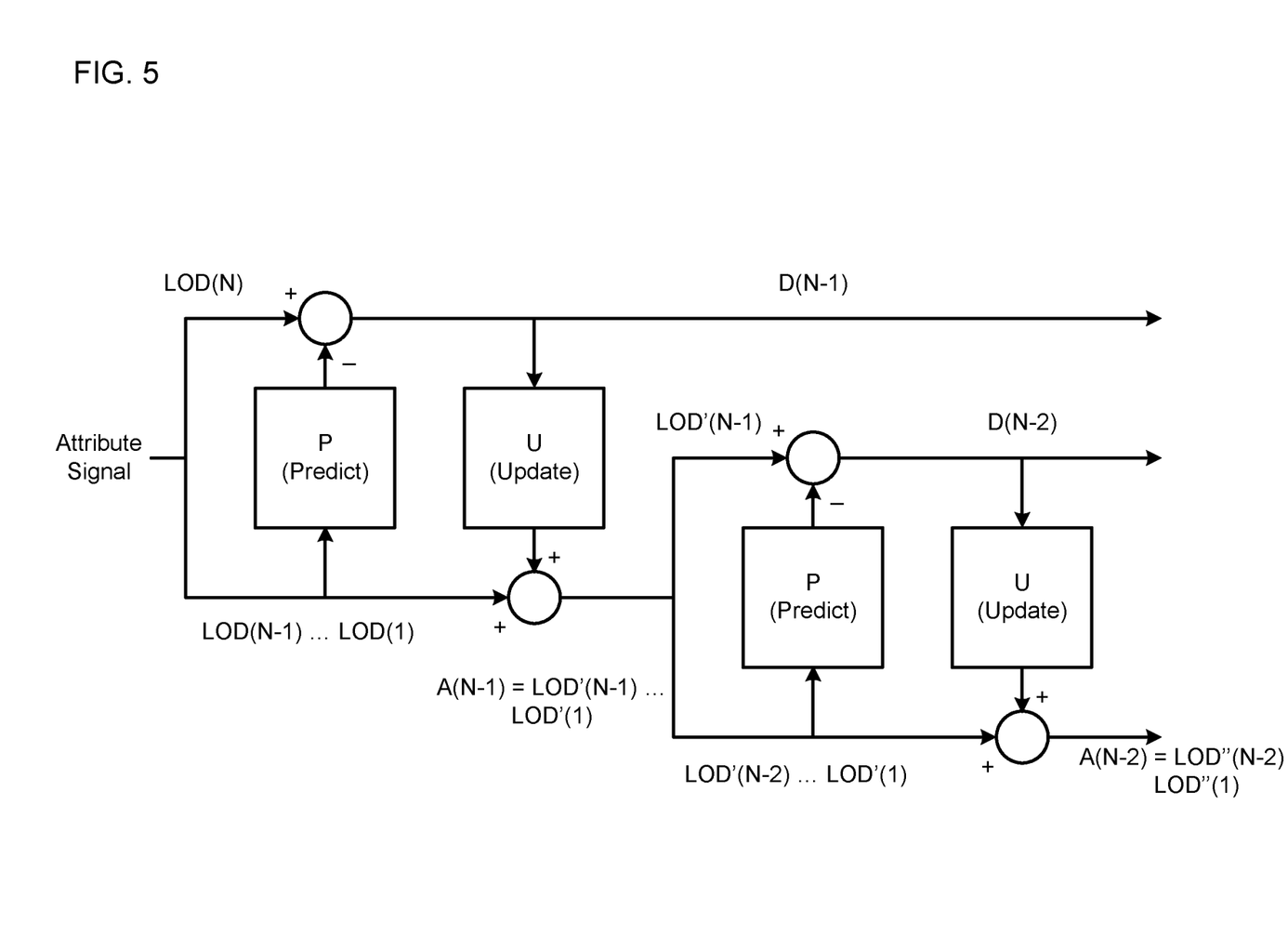
FIG. 5 is a diagram of an architecture for P/U-lifting in G-PCC.

FIG. 5 is a diagram of an architecture for P/U (Prediction/Update)-lifting in G-PCC. To facilitate prediction and update steps in lifting, one has to split a signal into two sets of high-correlation at each stage of decomposition. In the lifting scheme in G-PCC, the splitting is performed by leveraging an LoD structure in which such high-correlation is expected among levels and each level is constructed by a nearest neighbor search to organize non-uniform point clouds into a structured data. A P/U decomposition step at a level N results in a detail signal D(N-1) and an approximation signal A(N-1), which is further decomposed into D(N-2) and A(N-2). This step is repeatedly applied until a base layer approximation signal A(1) is obtained.

Consequently, instead of coding an input attribute signal itself that consists of LOD(N), . . . , LOD(1), one ends up coding D(N-1), D(N-2), . . . , D(1), A(1) in the lifting scheme. Note that application of efficient P/U steps often leads to sparse sub-bands "coefficients" in D(N-1), . . . , D(1), thereby providing a transform coding gain advantage.

Currently, a distance-based weighted average prediction described above for the predicting transform is used for a prediction step in the lifting as an anchor method in G-PCC.

The G-PCC model separately compresses the geometry information and the associated attributes such as color or reflectance. The geometry information, which is the 3D coordinates of the point clouds, is coded by octree-decomposition of its occupancy information. On the other hand, the attribute information is encoded by a differential pulse code modulation (DPCM)-like technique which performs closed-loop prediction of LOD (Level-Of-Detail) data between different levels. The LOD information is built in an identical manner at the encoder and the decoder based upon the decoded geometry information. Basically, the LOD is built in such a way that more detailed information of the given point cloud is obtained in a successive manner as more LOD is provided. When the sample-based prediction is performed for attribute coding, the nearest-neighbor based tree search is leveraged to find neighboring samples to do a weighted prediction. The weight is calculated as the inverse of the geometric distance of each of the neighboring samples.

A Lifting Transform, for example the P/U lifting illustrated in FIG. 5, may build on top of the Predicting Transform described above. The main difference between the prediction scheme and the lifting scheme is the introduction of an update operator.

The LOD-based prediction strategy described above makes points in lower LODs more influential b they are used more often for prediction. Let w(P) be the influence weight associated with a point P. Then w(P) is computed by applying the following recursive procedure:
  et w(P)=1 for all points
  Traverse the points according to the inverse of the order defined by the LOD structure
  For every point Q(i,j), update the weights of its neighbors P∈V(Q(i,j)) as follows:

w(P)←w(P)+w(Q(i,j),j) α(P,Q(i,j)).

The update operator uses the prediction residuals D(Q(i, j)) to update the attribute values of LOD(j). More precisely, let Δ(P) be the set of points Q(i,j) such that P∈V(Q(i,j)). The update operation for P may be defined as follows:

$$\text{Update}(P) = \frac{\sum_{Q \in \Delta(P)} [\alpha(P, Q) \times w(Q) \times D(Q)]}{\sum_{Q \in \Delta(P)} [\alpha(P, Q) \times w(Q)]} \quad \text{(Equation 1)}$$

The influence weights computed during the transform process are leveraged in order to guide the quantization process. More precisely, the coefficients associated with a point P are multiplied by a factor of √(w(P)). An inverse scaling process by the same factor is applied after inverse quantization on the decoder side. Note that the scaling factors are completely determined by the reconstructed geometry and they do not need to be encoded in the bitstream.

In embodiments, a fixed-point version of the Lifting and the Prediction schemes may be used. For example, floating-point arithmetic may be replaced with fixed-point arithmetic, an approximated version of the square-root function may be used, LUT-based division approximation may be used to avoid expensive divisions needed to compute the prediction weights, the update weights and the quantized/unquantized coefficients, and the update operation may be updated as follows in order to reduce the bit depth needed for fixed-point arithmetic:

$$\text{Update}(P) = \frac{\sum_{Q \in \Delta(P)} \left[ \alpha(P, Q) \times \sqrt{w(Q)} \times D(Q) \right]}{\sum_{Q \in \Delta(P)} \left[ \alpha(P, Q) \times \sqrt{w(Q)} \right]} \quad \text{(Equation 2)}$$

The lifting scheme in G-PCC test model TMC13 is based on fixed-point implementation and introduces two scaling factors for proper handling of numeric value ranges of integer operations. The first one is kFixedPointWeightShift which performs scaling of the 'weights' described above for Update-step. The other is kFixedPointAttributeShift that scales up the lifting coefficients so that proper dynamic ranges of signals can be maintained.

Embodiments relate to two changes to this lifting scheme.

The first change, relating to quantization Weights is as follows:

```
s = kFixedPointWeightShift/2;
if (lossless_flag==1)
    for (auto& w : quantizationWeights) {
        w = isqrt(w);
        int m = divExp2RoundHalfInf(w, s);
        w = m << s;
    }
else
    for (auto& w : quantizationWeights)
        w = isqrt(w);
``` where divExp2RoundHalfInf(w,s) is an operation that performs an integer division of w r by 2^s, rounding intermediate half values away from zero. Also isrqt(x) is an integer approximation of the square root of a number x.

In this step, when lossless_flag is set to be 1, a rounding of the quantization weights to a multiple of kFixedPointWeightShift/2 is performed. This is necessary due to the fact that the lifting coefficients will be scaled by √kFixedPointWeightShift before quantization.

Regarding kFixedPointAttributeShift, an additional rounding may be introduced for Predict/Update steps as follows:

```
            Predict-Step:
predicted = divExp2RoundHalfInf(predicted, kFixedPointWeightShift);
if (lossless_flag==1) {
        int m = divExp2RoundHalfInf(predicted, kFixedPointAttributeShift);
        predicted = m << kFixedPointAttributeShift;
}
            Update-Step:
update = (update + sumWeights / 2) / sumWeights;
if (lossless_flag==1) {
        int m = divExp2RoundHalfInf(update, kFixedPointAttributeShift);
        update = m << kFixedPointAttributeShift;
}
```

When going through Predict/Update steps, the resulting coefficient values are not always a multiple of (1<<kFixedPointAttributeShift) while the original scaled coefficients are. In this proposed step, the output of Update/Predict steps are rounded to a multiple of kFixedPointAttributeShift so that the reconstruction can be lossless after scaling back by the same amount at the final stage of reconstruction when the lifting coefficients as a result of Update/Predict steps are coded without quantization. Note that since this truncation occurs inside Predict/Update step, the integer-reversibility is still maintained.

In embodiments, when kFixedPointAttributeShift is set to 0 and still the proper dynamic range can be maintained during the lifting-process, this step can be omitted.

Table 1 and Table 2 below relates to changes in parameter set syntax which may be used in an implementation of embodiments discussed above.

TABLE 1

|  | Descriptor |
|---|---|
| attribute_parameter_set( ) { |  |
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   isLifting = |  |
|   (attr_coding_type = = \|\| attr_coding_type = = 2)? 1 : 0 |  |
|   if(isLifting) { |  |
|     lifting_num_pred_nearest_neighbours | ue(v) |
|     lifting_max_num_direct_predictors | ue(v) |
|     lifting_search_range_minus1 | ue(v) |
|     lifting_lod_regular_sampling_enabled_flag | u(1) |
|     lifting_num_detail_levels_minus1 | ue(v) |
|     for(idx = 0; |  |
|     idx <= num_detail_levels_minus1; idx++) { |  |
|       if(lifting_lod_decimation_enabled_flag) |  |
|         lifting_sampling_period[idx] | ue(v) |
|       else |  |
|         lifting_sampling_distance_squared[idx] | ue(v) |
|     } |  |
| } |  |

TABLE 2

| if(attr_coding_type = = 0) { |  |
|---|---|
|   lifting_adaptive_prediction_threshold | ue(v) |
|   lifting_intra_lod_prediction_num_layers | ue(v) |
| } |  |
| if (attribute_coding_type = = 1) {//RAHT |  |
|   raht_prediction_enabled_flag | u(1) |
|   raht_depth_minus1 | ue(v) |
| } |  |
| if(attribute_coding_type = = 2) { |  |
|   lifting_scalability_enabled_flag | u(1) |

TABLE 2-continued

|   lifting_lossless_enabled_flag | u(1) |
|---|---|
| } |  |
| aps_extension_present_flag | u(1) |
| if(aps_extension_present_flag) |  |

TABLE 2-continued

```
    while(more_data_in_byte_stream( ) )
        aps_extension_data_flag                u(1)
    byte_alignment( )
}
``` lifting_lossless_enabled_flag equal to 1 may specify that the attribute decoding process performs the truncation steps needed for lossless reconstruction.

In embodiments, a process inyerseUpdate() may be defined below.

Inputs of this process may be a variable attrCnt specifying the attribute dimension, a series of attribute coefficients attributeCoefficients[i][j], where i is in the range of 0 to PointNum−1, inclusive, and j in the range of 0 to attrCnt−1, inclusive, an array of prediction predictionWeights[i][n], where i is in the range of 0 to PointNum−1, inclusive, and n in the range of 0 to numPredNearestNeighbours−1, inclusive.

The process may update the attribute coefficients attributeCoefficients. It may proceed as follows.

```
for (i = 0; i < startIndex; i++) {
    updateWeights[i] = 0;
    for (j = 0; j < attrCnt; j++)
        updates[ i ][ j ] = 0
}
pointCount = endIndex − startIndex;
for (i = 0; i < pointCount; i++) {
    index = predictorCount − i − 1 + startIndex;
    currentQuantWeight = quantizationWeights[index];
    for (p = 0; p < neighboursCount[index]; p++) {
        neighbourIndex = neighbours[index][p];
        weight = predictionWeights[index][p] × currentQuantWeight;
        updateWeights[neighbourIndex] += weight;
        for (j = 0; j < attrCnt; j++)
            updates[neighbourIndex][j] += weight × attributeCoefficients[index][j];
    }
}
for (i = 0; i < startIndex; i++) {
    if (updateWeights[i] > 0) {
        bias = updateWeights[i] >> 1;
        updates[i][j]= (updates[i][j] + bias) / updateWeights[i];
    if (lifting_lossless_enabled_flag) {
        m = divExp2RoundHalfInf(updates[i][j], kFixedPointAttributeShift);
        updates[i][j] = m << kFixedPointAttributeShift;
    }
    for (j = 0; j < attrCnt; j++)
        attributeCoefficients[index][j] −= updates[i][j]
    }
}
```

In embodiments, a process inversePrediction() may be defined as follows. Inputs of this process may be a variable attrCnt specifying the attribute dimension, a series of attribute coefficients attributeCoefficients[i][j], where i is in the range of 0 to PointNum−1, inclusive, and j in the range of 0 to attrCnt−1, inclusive, an array of quantization weights quantizationWeights[i], where i is in the range of 0 to PointNum−1, inclusive. an array of prediction predictionWeights[i][n], where i is in the range of 0 to PointNum−1, inclusive, and n in the range of 0 to numPredNearestNeighbours−1, inclusive, an array pointCountPerLevelOfDetail [1], where 1 is in the range of 0 to levelDetailCount−1, inclusive, a variable FixedPointWeightShift specifying the fixed-point representation precision for quantization weights.

The process may update the attribute coefficients attributeCoefficients. It proceeds as follows.

```
pointCount = endIndex − startIndex;
for (i = 0; i < pointCount; i++) {
    index = predictorCount − i − 1 + startIndex;
    for (j = 0; j < attrCnt; j++) {
        predicted = 0;
        for (p = 0; p < neighboursCount[index]; p++) {
            neighbourIndex = neighbours[index][p];
            predicted += predictionWeights[index][p] × attributeCoefficients[neighbourIndex][j];
        }
        predicted = divExp2RoundHalfInf(predicted, FixedPointWeightShift);
        if (lifting_lossless_enabled_flag) {
```

```
            m = divExp2RoundHalfInf(predicted, kFixedPointAttributeShift);
            predicted = m << kFixedPointAttributeShift;
        }
        attributeCoefficients[index][j] += predicted;
    }
}
```

In embodiments, a quantization weights derivation process may be defined as follows. The following may be added at the end of the current derivation steps. if (lifting_lossless_enabled_flag)

```
for (i = 0; i < PointNum; i++) {
    m = divExp2RoundHalfInf(quantizationWeights[ i ], kFixedPointWeightShift>>1);
    quantizationWeights[ i ] = m << (kFixedPointWeightShift>>1);
}
```

Embodiments may relate to iterating over multiple bitplanes from MSB (Most Significant Bit) down to LSB (Least Significant Bit) of each lifting transform coefficient.

Given each bitplane level, the corresponding quantization step-size is calculated and whether each coefficient is larger than the said step-size is signaled as a 'significance' bit. Once it is determined to be significant, the sign-bit is sent immediately after. For the coefficients that were determined to be significant in one of the previous bitplane levels, the 'refinement' bits are sent to indicate if the corresponding bit is zero or not in the binary representation of the coefficient value.

In harmonization with the current G-PCC anchor design of coefficient coding, if the aforementioned 'significant' or 'refinement' bits from the consecutive coefficients are a series of zeros, the zero_cnt is sent instead of explicitly coding those bits. When any of the coefficient happens to have a non-zero bit at that particular level, zero_cnt is set to 0 and the aforementioned bits are coded explicitly one by one.

In the following description, a C-like pseudo-code is presented for the decoding process where reflectance is a representative type of single-channel point-cloud signal and quantWeight is a quantization weighting factor described above that the decoder has already available.

reflectance may be the output of the decoding process and initialized to zero at the beginning.

NumLevel may be the MSB of the maximum absolute value of reflectance* quantWeight considering all the coefficients and sent to the decoder at the beginning of the decoding process.

LastLevel may be the LSB of reflectance* quantWeight that corresponds to the final quantization level.

signif[predictorIndex] may indicate if the coefficient with the index equal to predictorIndex was already shown to be significant (i.e., greater than one of the previous quantization levels)

sign[predictorIndex] may indicate the sign of the already significant coefficient decodeZeroCnt() may return the number of zeros at a particular bitplane level in the binary representation for a consecutive set of lifting coefficients being decoded.

decodeSign() may return the sign of the coefficient that has just turned significant at the current bitplane level.

```
zero_cnt = decodeZeroCnt( )
for level = NumLevel - 1 down to LastLevel
{
    qs_level = 1 << level
    for predictorIndex = 0 up to predictorCount-1
    {
        delta = 0
        if (zero_cnt > 0)
            zero_cnt--
        else
        {
            if (signif[predictorIndex] == 0)
            {
                delta = (decodeSign( ) == 1) ? 1 : -1
                sign[predictorIndex] = delta
                signif[predictorIndex] = 1
            }
            else
                    delta = sign[predictorIndex]
            zero_cnt = decodeZeroCnt( )
        } // end-of-zerocnt-is-zero-routine
        reflectance += InverseQuantization(delta, qs_level)
        if (level == LastLevel)
            reflectance /= quantWeight
    } // end of predictorIndex-loop
    zero_cnt = decodeZeroCnt( )
} // end-of level-loop
```

In the following description, a C-like pseudo-code is presented for the decoding process where color is a representative type of three-channel point-cloud signal and quantWeight is the quantization weighting factor described in Section 2 that the decoder has already available.

color may be the output of the decoding process and initialized to zero at the beginning NumLevel may be the MSB of the maximum value of color* quantWeight considering all the coefficients and sent to the decoder at the beginning LastLevel may be the LSB of color* quantWeight that corresponds to the final quantization level signif[predictorIndex] may indicate if the coefficient with the index equal to predictorIndex was already shown to be significant (i.e., greater than one of the previous quantization levels)

sign[predictorIndex] may indicate the sign of the already significant coefficient decodeZeroCnt() may return the number of zeros at a particular bitplane level in the binary representation for a consecutive set of lifting coefficients being decoded. Here 'zero' corresponds to the case where all three components of the coefficient are zero.

decodeSignificant(d) may return 1 when the d-th channel of the coefficient is significant at the current bitplane level. Otherwise it may return 0.

decodeSign(d) may return the sign of the d-th channel of the coefficient that has just turned significant at the current bitplane level.

decodeRefine(d) may return 1 when the d-th channel of the coefficient which already turned significant at one of the previous bitplane levels has 1 in the binary representation of its value at the current bitplane level. Otherwise it returns 0.

performed based upon the predictorIndex's ranging from 0 to the maximum number of points minus one.

A set may be defined based upon the dependencies of points across multiple LODs.

A set S of voxels or a voxel may be significant if at least one member of S or the voxel has a coefficient value larger than or equal to the threshold $\gamma(\triangleq 2^n)$. It is indicated by $\Gamma_n(S)$ as follows where $v_i$ represents the coefficient value of the point (i.e., voxel) with the predictorIndex i.

```
zero_cnt = decodeZeroCnt( )
for level = NumLevel − 1 down to LastLevel
{
    qs_level = 1 << level
    for predictorIndex = 0 up to predictorCount−1
    {
        detail[3] ={0,0,0};
        delta[3] = {0,0,0};
        if (zero_cnt > 0) {
            zero_cnt−−;
        }
        else
        {
            for d=0 to 3
            {
                if (signif[predictorIndex][d] == 0)
                {
                    if !(d==2 && signif[predictorIndex][0]==0
            && signif[predictorIndex][1]==0))
                        sig = decodeSignificant(d)
                    else
                        sig=1
                    if (sig)
                    {
                        delta[d] = (decodeSign(d) == 1) ? 1 : −1
                        sign[predictorIndex][d] = delta[d]
                        signif[predictorIndex][d] = 1
                    }
                } else
                    delta[d] = decodeRefine(d) * sign[predictorIndex][d]
            }//end-of-for d
            zero_cnt = decodeZeroCnt( )
        }// end-of-zerocnt-is-zero-routine
        for d=0 to 3
          color[d] + = InverseQuantization(delta[d], qs_level)
        if (level == LastLevel)
          color /= quantWeight
    } // predictorIndex loop
    zero_cnt = decodeZeroCnt( )
} // level loop
```

Embodiments may relate to iterating over multiple bitplanes from MSB (Most Significant Bit) down to LSB (Least Significant Bit) of each lifting transform coefficient.

In embedded coefficient coding, given a binary representation of the lifting coefficients, all the coefficients may be checked bitplane by bitplane (from MSB to LSB). At each bitplane, each coefficient is checked whether it is larger than the corresponding quantization step-size of the bitplane. The result is signaled as a 'significance' bit. Once it is determined to be significant, the sign-bit is sent immediately after. For the coefficients that were determined to be significant in one of the previous bitplane levels, the 'refinement' bits are sent to indicate if the corresponding bit is zero or not in the binary representation of the coefficient value.

In embodiments, a set-partitioning idea may be employed to facilitate coding of the abovementioned significance information in the context of the lifting scheme in G-PCC.

In the current G-PCC lifting design, as a result of the LOD (Level-Of-Detail) generation for selecting prediction candidates, all the points in the cloud are sorted and assigned predictorIndex's. The coding of the lifting coefficients is $$\Gamma_n(S) = \begin{cases} 1, & \max_{i \in S}\{|v_i|\} \geq \gamma \\ 0, & \text{otherwise} \end{cases} \quad \text{(Equation 3)}$$

A list of insignificant sets (LIS) may contain sets of transform coefficients which have been found to have magnitude smaller than a threshold.

A list of insignificant voxels (LIV) may contain individual coefficients that have magnitude smaller than the threshold.

A list of significant voxels (LSV) may contain individual coefficients that have magnitude larger than or equal to the threshold.

O(i) may be a set of direct descendants of the point with predictorIndex i, where the descendants all belong to LOD (n+1) when the point with predictorIndex i belongs to LOD(n).

D(i) may be a set of descendants of the point with predictorIndex i, where the descendants can belong to LOD (n+1) through LOD(NumOfLOD_Minus1) when the point with predictorIndex i belongs to LOD(n).

$\mathcal{L}(i) \triangleq D(i)-O(i)$ may be a set of descendants of the point with predictorIndex i, where the descendants can belong to LOD(n+2) through LOD(NumOfLOD_Minus1) when the point with predictorIndex i belongs to LOD(n).

A decoding algorithm may proceed as follows:
1. Initialization

Decode $n_{max}$, which is the maximum bitplane number. Set n to $n_{max}$.

Set the LSV as an empty list, and add the predictorIndex's of all the points in LOD(0) to the LIV, and also to the LIS as type A entries.

2. Sorting pass

This pass ends after all the entries in the LIS list including the newly created ones during the pass itself are tested once.

Step (a):
  for each predictorIndex i in the LIV do;
    (i) decode $\Gamma_n(i)$;
    (ii) if $\Gamma_n(ii)=1$ then move predictorIndex i to the LSV and decode the sign of predictorIndex i;
Step (b):
  for each entry i in the LIS do;
    (i) if the entry is of type A then
      decode $\Gamma(D(i))$;
      if $\Gamma_n(D(i))=1$ then
        for each predictorIdx k∈O(i) do;
          decode $\Gamma_n(k)$:
          if $\Gamma_n(k)=1$ then add predictorIndex k to the LSV and decode the sign of predictorIndex k
          if $\in_n(k)=0$ then add predictorIndex k to the end of the LIV
      if $\mathcal{L}(i) \neq \emptyset$ then move predictorIndex i to the end of the LIS as type B;
      otherwise remove predictorIndex i from the LIS;
    (ii) if the entry is of type B then
      decode $\Gamma_n(\mathcal{L}(i))$;
      if $\Gamma_n(\mathcal{L}(i))=1$ then
        add each predictorIndex k∈O(i) to the end of the LIS as type A;
        remove predictorIndex i from the LIS;

3. Refinement Pass

For each predictorIndex i in the LSV, except those included in the last sorting pass (i.e., with the same n), deocde the n-th most significant bit of predictorIndex i.

4. Threshold Update

Decrement n by 1 and go to Step 2 (Sorting pass).

In embodiments, assuming the predictorIndex i belongs to LOD(n), D(i) may include all the points in LOD(n+1) . . . LOD(NumOfLOD Minus1) that are "connected" in the sense that they use predictorIndex i as one of multiple predictors directly or indirectly. Similarly, O(i) may include all the points in LOD(n+1) that are "connected" in the sense that they directly use predictorIndex i as one of multiple predictors.

As an example, the current G-PCC Test-Model employs a nearest-neighbor search based on geometric-distance or similar measures to select predictor candidates from lower LOD layers. This selection process is repeated from top to bottom LODs and will "connect" points in terms of prediction usages directly or indirectly.

In embodiments, assuming the predictorIndex i belongs to LOD(n), D(i) may include all the points in LOD(n+1) . . . LOD(NumOfLOD_Minus1) that are "connected" in the sense that they use predictorIndex i as the closest predictor out of chosen multiple predictors directly or indirectly. Similarly, O(i) may include all the points in LOD(n+1) that are "connected" in the sense that they directly use predictorIndex i as the closest predictor out of chosen multiple predictors.

As an example, the current G-PCC Test-Model employs a nearest-neighbor search based on geometric-distance or similar measures to select predictor candidates from lower LOD layers. This selection process is repeated from top to bottom LODs and will "connect" points in terms of prediction usages directly or indirectly.

In embodiments, assuming the predictorIndex i belongs to LOD(n), D(i) may include all the points in LOD(n+1) . . . LOD(NumOfLOD_Minus1) that belong to a range of 3D coordinates for which the point with the predictorIndex i is the closest neighbor. Similarly, O(i) includes all the points in LOD(n+1) that belong to a range of 3D coordinates for which the point with the predictorIndex i is the closest neighbor.

Figure 6:
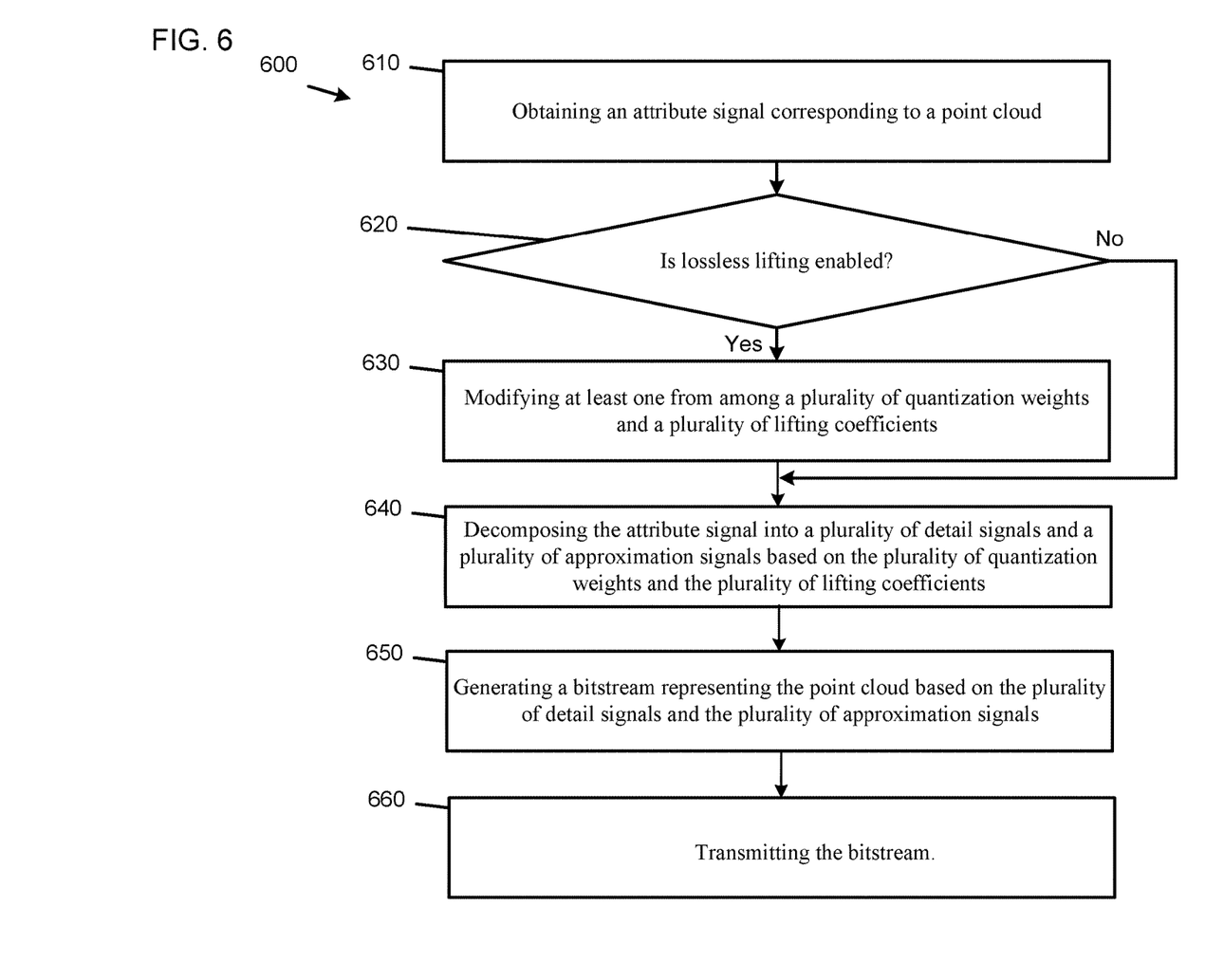
FIG. 6 is a flowchart illustrating a method for point cloud attribute coding, according to embodiments.

FIG. 6 is a flowchart illustrating a method 600 of point cloud attribute coding, according to embodiments. In some implementations, one or more process blocks of FIG. 6 may be performed by the G-PCC decompressor 210. In some implementations, one or more process blocks of FIG. 6 may be performed by another device or a group of devices separate from or including the G-PCC decompressor 210, such as the G-PCC compressor 203.

Referring to FIG. 6, in a first block 610, the method 600 includes obtaining an attribute signal corresponding to a point cloud.

In a second block 620, the method 600 includes determining whether lossless lifting is enabled.

Based on determining that the lossless lifting is enabled, the method 600 continues in a third block 630. In the third block 630, the method 600 includes modifying at least one from among a plurality of quantization weight and a plurality of lifting coefficients. Then, in a fourth block 640, the method 600 includes decomposing the attribute signal into a plurality of detail signals and a plurality of approximation signals based on the modified at least one from among the plurality of quantization weights and the plurality of lifting coefficients.

Based on determining that the lossless lifting is enabled, the method 600 skips the third block 630, and proceeds to fourth block 640, in which case the method includes decomposing the attribute signal into a plurality of detail signals and a plurality of approximation signals based on the unmodified plurality of quantization weights and plurality of lifting coefficients.

In a fifth block 650, the method 600 includes generating a bitstream representing the point cloud based on the plurality of detail signals and the plurality of approximation signals.

In a sixth block 660, the method 600 includes transmitting the bitstream.

In embodiments, the lossless lifting may be determined to be enabled based on a lossless lifting flag.

In embodiments, the modifying may further include rounding each of the plurality of quantization weights to be a multiple of a predetermined weight constant.

In embodiments, the modifying may further include rounding each of the plurality of lifting coefficients to be a multiple of a predetermined lifting constant.

In embodiments, the method 600 may further include checking a bitplane of a lifting coefficient of the plurality of lifting coefficients to determine if the bitplane is larger than a corresponding quantization step size of the bitplane, and setting a significance bit based on a result of the determining.

In embodiments, based on determining that the bitplane is larger than the corresponding quantization step size, the significance bit is set to indicate that the bitplane is significant.

In embodiments, the method 600 may further include, based on a previous bitplane being determined to be significant, setting a refinement bit based on a value of a bit representing the bitplane.

In embodiments, the attribute signal may relate to a reflectance of the point cloud.

In embodiments, the attribute signal may relate to a color of the point cloud.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 7:
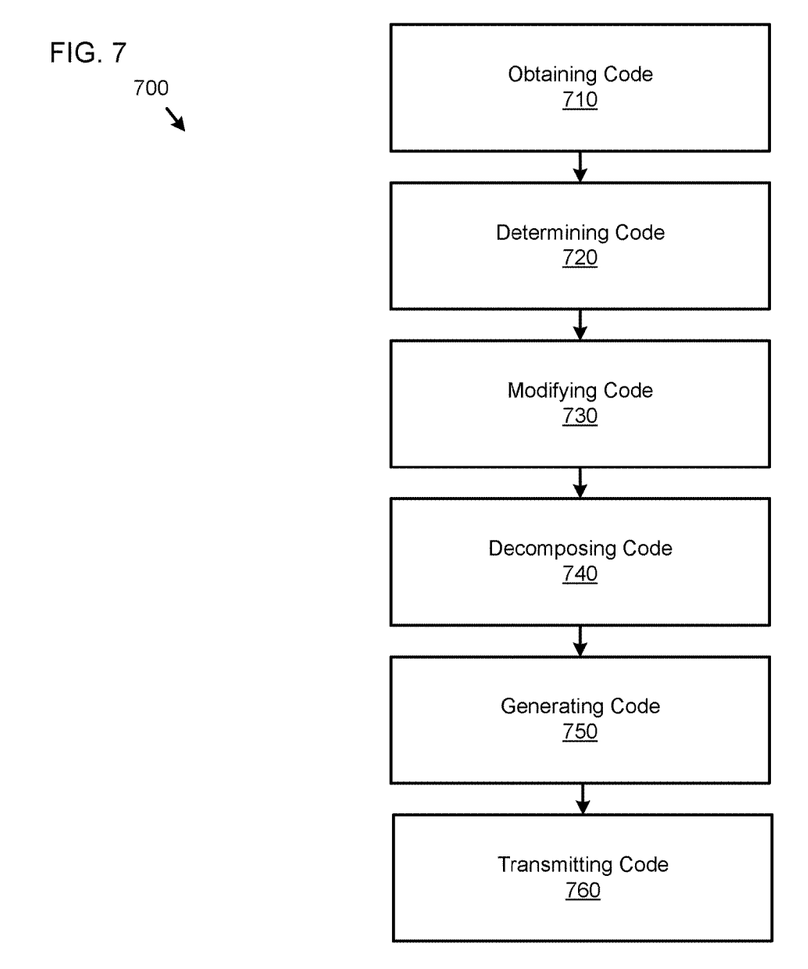
FIG. 7 is a block diagram of an apparatus for point cloud attribute coding, according to embodiments.

FIG. 7 is a block diagram of an apparatus 700 for point cloud attribute coding, according to embodiments.

Referring to FIG. 7, the apparatus 700 includes obtaining code 710, determining code 720, modifying code 730, decomposing code 740, generating code 750, and transmitting code 750.

The obtaining code 710 is configured to cause the at least one processor to obtain an attribute signal corresponding to a point cloud.

The determining code 720 is configured to cause the at least one processor to determine whether lossless lifting is enabled.

The modifying code 730 configured to cause the at least one processor to, based on determining that lossless lifting is enabled, modify at least one from among a plurality of quantization weight and a plurality of lifting coefficients.

The decomposing code 740 is configured to cause the at least one processor to decompose the attribute signal into a plurality of detail signals and a plurality of approximation signals based on the modified at least one from among the plurality of quantization weights and the plurality of lifting coefficients.

The generating code 750 is configured to cause the at least one processor to generate a bitstream representing the point cloud based on the plurality of detail signals and the plurality of approximation signals; and The transmitting code 760 is configured to cause the at least one processor to transmit the bitstream.

In embodiments, the lossless lifting may be determined to be enabled based on a lossless lifting flag.

In embodiments, the modifying code is further configured to cause the at least one processor to round each of the plurality of quantization weights to be a multiple of a predetermined weight constant.

In embodiments, the modifying code is further configured to cause the at least one processor to round each of the plurality of lifting coefficients to be a multiple of a predetermined lifting constant.

In embodiments, the apparatus 700 further includes checking code configured to cause the at least one processor to check a bitplane of a lifting coefficient of the plurality of lifting coefficients to determine if the bitplane is larger than a corresponding quantization step size of the bitplane, and first setting code configured to cause the at least one processor to set a significance bit based on a result of the determining.

In embodiments, based on determining that the bitplane is larger than the corresponding quantization step size, the significance bit may be set to indicate that the bitplane is significant.

In embodiments, the apparatus 700 further includes second setting code configured to cause the at least one processor to, based on a previous bitplane being determined to be significant, set a refinement bit based on a value of a bit representing the bitplane.

In embodiments, the attribute signal may relate to a reflectance of the point cloud.

In embodiments, the attribute signal may relate to a color of the point cloud.

Figure 8:
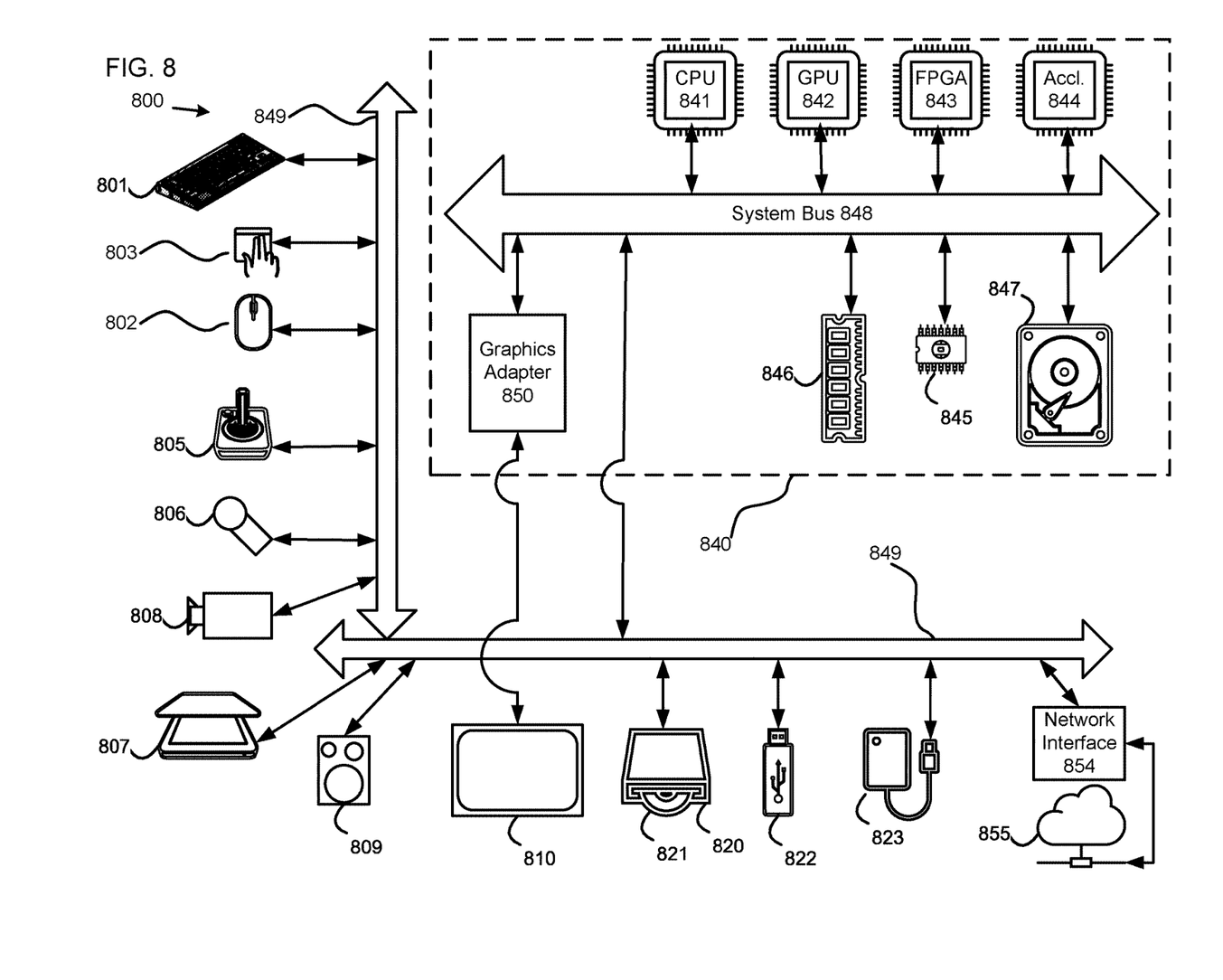
FIG. 8 is a diagram of a computer system suitable for implementing embodiments.

FIG. 8 is a diagram of a computer system 800 suitable for implementing embodiments.

Computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for the computer system 800 are examples in nature and are not intended to suggest any limitation as to the scope of use or functionality of the computer software implementing the embodiments. Neither should the configuration of the components be interpreted as having any dependency or requirement relating to any one or combination of the components illustrated in the embodiments of the computer system 800.

The computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): a keyboard 801, a mouse 802, a trackpad 803, a touchscreen 810, a joystick 805, a microphone 806, a scanner 807, and a camera 808.

The computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touchscreen 810 or the joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touchscreen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter 850 generates and outputs images to the touchscreen 810.

The computer system 800 can also include human accessible storage devices and their associated media such as optical media including a CD/DVD ROM/RW drive 820 with CD/DVD or the like media 821, a thumb drive 822, a removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system 800 can also include interface(s) to one or more communication networks 855. The communication networks 855 can for example be wireless, wireline, optical. The networks 855 can further be local, wide-area, metropolitan, vehicular and industrial, real-time, delay-tolerant, and so on. Examples of the networks 855 include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. The networks 855 commonly require external network interface adapters that attached to certain general purpose data ports or peripheral buses 849 (such as, for example universal serial bus (USB) ports of the computer system 800; others are commonly integrated into the core of the computer system 800 by attachment to a system bus as described below, for example, a network interface 854 including an Ethernet interface into a PC computer system and/or a cellular network interface into a smartphone computer system. Using any of these networks 855, the computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks 855 and network interfaces 854 as described above.

Aforementioned human interface devices, human-accessible storage devices, and network interfaces 854 can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators 844 for certain tasks, and so forth. These devices, along with read-only memory (ROM) 845, random-access memory (RAM) 846, internal mass storage 847 such as internal non-user accessible hard drives, solid-state drives (SSDs), and the like, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through the peripheral buses 849. Architectures for a peripheral bus include peripheral component interconnect (PCI), USB, and the like.

The CPUs 841, GPUs 842, FPGAs 843, and hardware accelerators 844 can execute certain instructions that, in combination, can make up the aforementioned computer code. That computer code can be stored in the ROM 845 or RAM 846. Transitional data can also be stored in the RAM 846, whereas permanent data can be stored for example, in the internal mass storage 847. Fast storage and retrieve to any of the memory devices can be enabled through the use of cache memory, that can be closely associated with the CPU 841, GPU 842, internal mass storage 847, ROM 845, RAM 846, and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system 800 having architecture, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as the core-internal mass storage 847 or ROM 845. The software implementing various embodiments can be stored in such devices and executed by the core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in the RAM 846 and modifying such data structures according to the processes defined by the software. In addition or as an alternative, the computer system can provide functionality as a result of logic hardwired or otherwise embodied in a circuit (for example: the hardware accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

What is claimed is:

1. A method of point cloud attribute coding, the method being performed by at least one processor, and the method comprising:

obtaining an attribute signal corresponding to a point cloud;

determining whether lossless lifting is enabled;

based on determining that lossless lifting is enabled, modifying at least one from among a plurality of quantization weight and a plurality of lifting coefficients;
checking a bitplane of a lifting coefficient of the plurality of lifting coefficients to determine if the bitplane is larger than a corresponding quantization step size of the bitplane,
setting a significance bit based on a result of the determining;
decomposing the attribute signal into a plurality of detail signals and a plurality of approximation signals based on the modified at least one from among the plurality of quantization weights and the plurality of lifting coefficients;
generating a bitstream representing the point cloud based on the plurality of detail signals and the plurality of approximation signals; and
transmitting the bitstream.

2. The method of claim 1, wherein the lossless lifting is determined to be enabled based on a lossless lifting flag.

3. The method of claim 1, wherein the modifying further comprises rounding each of the plurality of quantization weights to be a multiple of a predetermined weight constant.

4. The method of claim 1, wherein the modifying further comprises rounding each of the plurality of lifting coefficients to be a multiple of a predetermined lifting constant.

5. The method of claim 1, wherein based on determining that the bitplane is larger than the corresponding quantization step size, the significance bit is set to indicate that the bitplane is significant.

6. The method of claim 1, further comprising:
based on a previous bitplane being determined to be significant, setting a refinement bit based on a value of a bit representing the bitplane.

7. The method of claim 1, wherein the attribute signal relates to a reflectance of the point cloud.

8. The method of claim 1, wherein the attribute signal relates to a color of the point cloud.

9. An apparatus for point cloud attribute coding, the apparatus comprising:
at least one memory configured to store computer program code; and
at least one processor configured to access the at least one memory and operate according to the computer program code, the computer program code comprising:
obtaining code configured to cause the at least one processor to obtain an attribute signal corresponding to a point cloud;
determining code configured to cause the at least one processor to determine whether lossless lifting is enabled;
modifying code configured to cause the at least one processor to, based on determining that lossless lifting is enabled, modify at least one from among a plurality of quantization weight and a plurality of lifting coefficients;
checking code configured to cause the at least one processor to check a bitplane of a lifting coefficient of the plurality of lifting coefficients to determine if the bitplane is larger than a corresponding quantization step size of the bitplane, and
first setting code configured to cause the at least one processor to set a significance bit based on a result of the determining;

decomposing code configured to cause the at least one processor to decompose the attribute signal into a plurality of detail signals and a plurality of approximation signals based on the modified at least one from among the plurality of quantization weights and the plurality of lifting coefficients;
generating code configured to cause the at least one processor to generate a bitstream representing the point cloud based on the plurality of detail signals and the plurality of approximation signals; and
transmitting code configured to cause the at least one processor to transmit the bitstream.

10. The apparatus of claim 9, wherein the lossless lifting is determined to be enabled based on a lossless lifting flag.

11. The apparatus of claim 9, wherein the modifying code is further configured to cause the at least one processor to round each of the plurality of quantization weights to be a multiple of a predetermined weight constant.

12. The apparatus of claim 9, wherein the modifying code is further configured to cause the at least one processor to round each of the plurality of lifting coefficients to be a multiple of a predetermined lifting constant.

13. The apparatus of claim 9, wherein based on determining that the bitplane is larger than the corresponding quantization step size, the significance bit is set to indicate that the bitplane is significant.

14. The apparatus of claim 9, further comprising:
second setting code configured to cause the at least one processor to, based on a previous bitplane being determined to be significant, set a refinement bit based on a value of a bit representing the bitplane.

15. The apparatus of claim 9, wherein the attribute signal relates to a reflectance of the point cloud.

16. The apparatus of claim 9, wherein the attribute signal relates to a color of the point cloud.

17. A non-transitory computer-readable medium storing instructions, the instructions comprising: one or more instructions that are configured to, when executed by one or more processors of a device for point cloud attribute coding, cause the one or more processors to:
obtain an attribute signal corresponding to a point cloud;
determine whether lossless lifting is enabled;
based on determining that lossless lifting is enabled, modify at least one from among a plurality of quantization weight and a plurality of lifting coefficients;
check a bitplane of a lifting coefficient of the plurality of lifting coefficients to determine if the bitplane is larger than a corresponding quantization step size of the bitplane;
set a significance bit based on a result of the determining;
decompose the attribute signal into a plurality of detail signals and a plurality of approximation signals based on the modified at least one from among the plurality of quantization weights and the plurality of lifting coefficients;
generate a bitstream representing the point cloud based on the plurality of detail signals and the plurality of approximation signals; and
transmit the bitstream.

18. The non-transitory computer-readable medium of claim 17, wherein the lossless lifting is determined to be enabled based on a lossless lifting flag.

* * * * *